A. C. ROBINSON.
COMBINED AIR SUPPLY VALVE AND GAGE.
APPLICATION FILED MAY 31, 1917.
1,271,489.
Patented July 2, 1918.
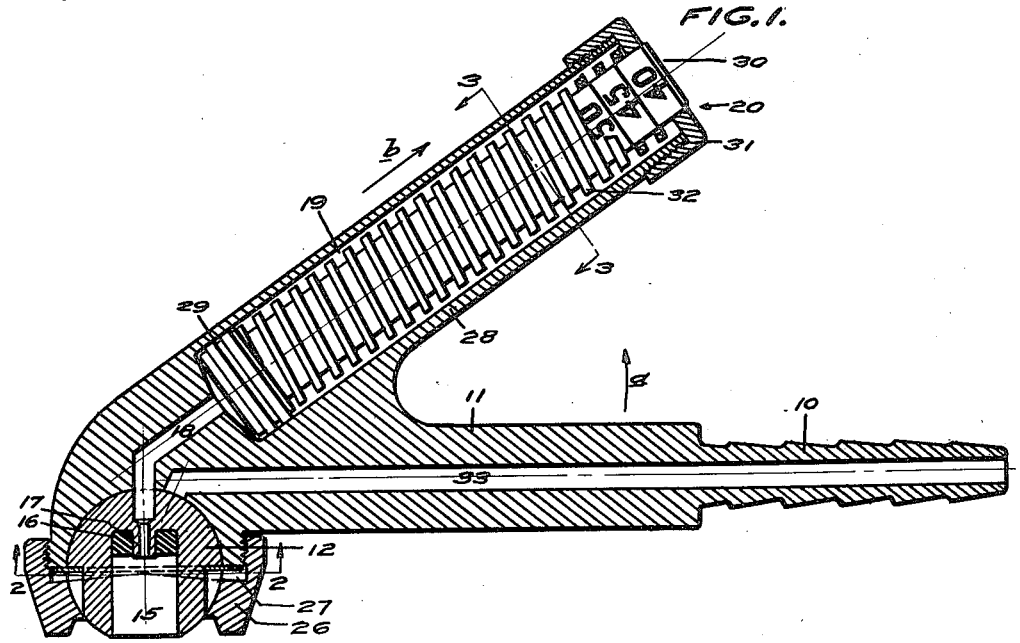
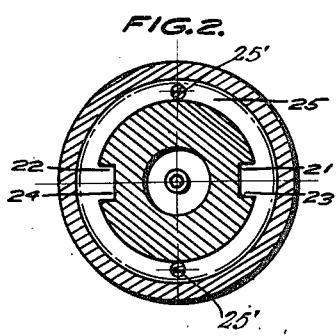
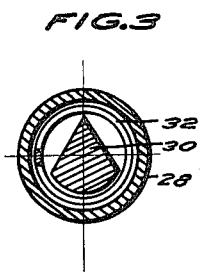
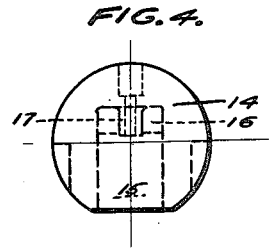
INVENTOR
ARTHUR C. ROBINSON
BY Hazard & Miller
ATT'YS

UNITED STATES PATENT OFFICE.

ARTHUR C. ROBINSON, OF LOS ANGELES, CALIFORNIA.

COMBINED AIR-SUPPLY VALVE AND GAGE.

1,271,489.　　　　　Specification of Letters Patent.　　Patented July 2, 1918.

Application filed May 31, 1917. Serial No. 172,057.

*To all whom it may concern:*

Be it known that I, ARTHUR C. ROBINSON, a citizen of the United States, residing at Los Angeles, in the county of Los Angeles and State of California, have invented new and useful Improvements in Combined Air-Supply Valves and Gages, of which the following is a specification.

This invention relates to a testing apparatus and particularly pertains to a combined tire tester and air faucet.

It is the principal object of this invention to provide an air faucet adapted to be positioned over the tire valve stem of a pneumatic tire and which is combined with a testing gage adapted to indicate the atmospheric pressure to which the tire has been inflated.

Another object of this invention is to provide a device of the above character which does not constantly register the atmospheric pressure within the tire, but which, by a simple movement, may be caused to inflate the tire, or register its pressure.

It is a further object of this invention to provide a combined air gage and faucet which is simple in its construction, is formed of few parts designed to withstand ordinary wear and which are not liable to become broken, or otherwise affected to render the device inoperative.

Other objects will appear hereinafter.

The invention is illustrated, by way of example, in the accompanying drawings in which:

Figure 1 is a view in section, as seen taken longitudinally of the device, and particularly illustrating the correlation of the vital elements of the invention.

Fig. 2 is a view in transverse section, as seen on the line 2—2 of Fig. 1, particularly illustrating the formation and mounting of the spherical inflating cap.

Fig. 3 is a view in transverse section as seen on the line 3—3 of Fig. 1, particularly disclosing the formation of the indicating gage stem.

Fig. 4 is a view in side elevation illustrating the spherical inflating cap as disassociated from its mounting.

Referring more particularly to the drawings, 10 indicates the stem of the faucet. This stem is here shown as formed with a series of circumferential serrations which permit the member to be positioned within the end of a tire inflating tube and there to be firmly held. It will be understood that this tube connects with a suitable source of air supply. The stem 10 is tubular and is formed integral with a tubular shank 11 which communicates with a hemispherical ball cup 12. This cup is adapted to receive a spheroidal cap 14 within the bore 15 of which a valve stem is adapted to be placed. The valve stem is of common construction and forms a part of a pneumatic tire which is being inflated therethrough. The bore 15 is fitted with a packing gasket 16 at its inner end, said gasket surrounding a tubular air duct 17. This duct is disposed along a continuation of the bore 15 and is enlarged at its inner end to communicate with an air-passage-way 18, which leads to a compression chamber 19 forming a part of an air gage 20. The cap 14 is formed with a pair of diametrically opposite recesses 21 and 22, as particularly shown in Figs. 2 and 4. These recesses have square walls and are adapted to receive oppositely disposed, inwardly extending tangs 23 and 24. The tangs form a part of a spring washer 25 which surrounds the equator of the cap 14 and is tightly secured along one side by means of a socket nut 26 within which the cap is retained, and screws 25'. This nut is threaded and is adapted to engage external threads upon the body portion of the faucet. Reference to Fig. 1 will disclose the fact that inclined recesses 27 are formed within the nut and surround substantially opposite halves of the spheroidal cap, thus relieving the sides of the spring washer 25 so that it may yield in a manner and for a purpose which will be hereinafter described.

The compression chamber 19 is formed within a cylindrical gage extension 28 which is inclined at an angle to the tubular shank 11 and formed integral therewith. Reciprocably mounted within this chamber is a registering plunger 29 which may be moved by the action of the air pressure through the air passage-way 18 into the chamber. This plunger is formed with a stem 30 having two flat faces, the remaining face being arcuate and concentric with the center of the plunger. This stem extends outwardly through a compression chamber cap 31 which is screwed over the end of the cylinder 28. The flat faces of the stem are graduated to indicate pounds pressure per square inch. The plunger is normally held in the position indicated in Fig. 1 and the stem concealed within the cylinder 28 by the expansive action of a helical spring 32 which circumscribes the stem 30 and is held between the shoulder of the plunger 29 and the inner face of the cap 31.

In operation, the bore 15 of the spheroidal cap 14 is positioned over the opened end of the penumatic tire stem by which the tire tube is inflated. The air pressure existing within the tire may be then ascertained. The members are in the position indicated by solid lines in Fig. 1, and the duct 17 is in register with the air passage-way 18 leading to the compression chamber 19. When the wall of the duct is forced into the open end of the valve stem, it will depress the point of the valve and permit air to pass from the tire through the duct 17 into the compression chamber 19. This will act against the end of the plunger 29 and cause it to move outwardly in the direction of the arrow —b—. As this plunger moves against the expansive action of the spring 32, the stem 30 will be caused to project from the cap 31 and will permit the numerals upon the side of the stem to be read. When pressure is relieved from the end of the tire valve, the tire will again be sealed and the plunger 29 will be permitted to assume its original position. The tire may then be inflated, as when the stem is thus positioned air may be admitted to the portions 10 and 11 from a suitable source of supply. This air is under pressure and when the body portion of the device is swung upwardly in the direction of the arrow —a— the end of the passage-way 33 will communicate with the enlarged portion of the duct 17 in the cap 14. The bore 15 and the duct will then assume a position in relation to the passage-way 33 as indicated by dotted lines in Fig. 1. In order to assume this position the cavities 27 will accommodate the spring washer 25 and allow the washer to be sprung in a manner to cause the spherical cap 14 to remain stationary while the body portion of the device rotates around the center of the sphere.

It will thus be seen that the device here disclosed may be easily and conveniently operated and will afford means for readily inflating a tire, as well as directly measuring the air pressure therein.

While I have shown the preferred form of my combined air supply valve and gage as now known to me, it will be evident that various changes in the combination, construction and arrangement of parts may be made by those skilled in the art without departing from the spirit of my invention.

I claim:

1. A combined air faucet and gage comprising a tubular shank in communication with a source of air supply, a gage case formed integral with said shank and inclined in relation thereto, an air passage-way formed through the shank, a spherical socket with which said passage-way is in communication, a compression chamber formed within said gage case, an air passage-way establishing communication with said chamber and said socket, a spheroidal cap member positioned within the socket and adapted to fit over the opened end of a pneumatic tire stem, means whereby said body portion comprising the shank and case may be alternately brought to establish communication between the passage-ways leading through the shank and case with the tire stem, an indicating plunger positioned within said compression chamber, and means whereby communication between the passage-way from the chamber to the stem will cause the atmospheric pressure within the pneumatic tire to be indicated.

2. A combined air faucet and gage comprising a tubular shank adapted to be connected with a source of air, an air gage mounted upon said shank, a tire stem receptacle adapted to be positioned over the inflating valve of a pneumatic tire, and means whereby said shank and gage may be moved in relation to said receptacle to alternately permit air to pass from the source of supply through the receptacle to the stem or from the stem through the receptacle to the gage.

3. In a combined air faucet and gage having an air supply shank and an air gage rigidly mounted upon said shank, a tire stem receptacle consisting of a spherical cap adapted to seat over the mouth of the tire stem and to rotate in relation to the shank and gage, and spring means for yieldably holding said cap upon its seat to prevent leakage of air between it and the seat.

In testimony whereof I have signed my name to this specification.

A. C. ROBINSON.